March 21, 1967

J. G. BAYLY ETAL 3,310,736

METHOD AND APPARATUS FOR TRANSMITTING SIGNAL INFORMATION
FROM AN ENCLOSED REGION TO AN EXTERIOR REGION
WITHOUT DIRECT ELECTRICAL CONNECTION
BETWEEN THE REGIONS

Filed Oct. 4, 1963

INVENTORS
JOHN GOODENOUGH BAYLY
EDWARD HESKETH de GREY

By Cushman, Darby & Cushman
ATTORNEYS

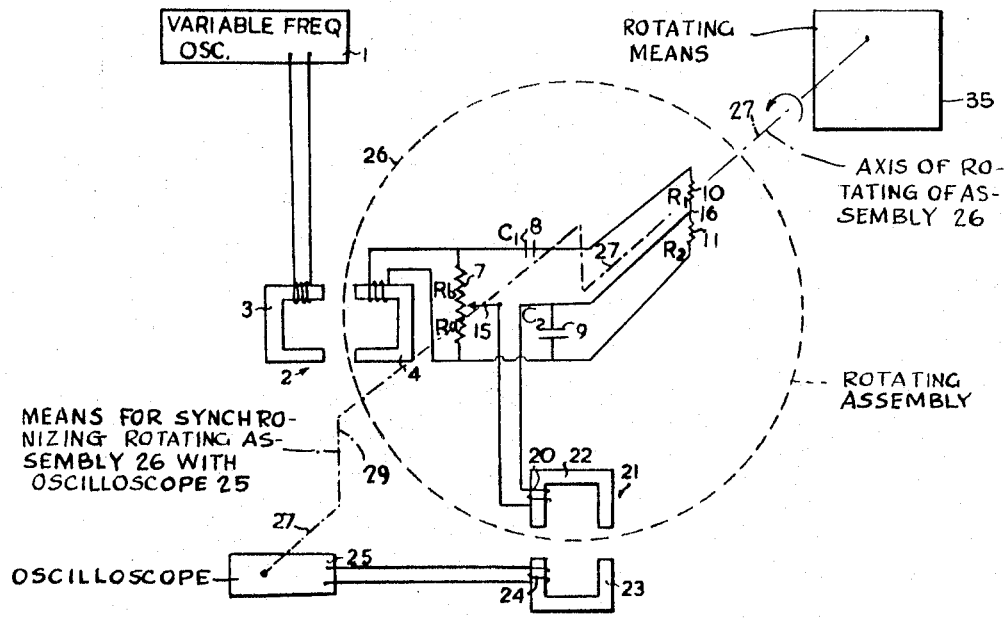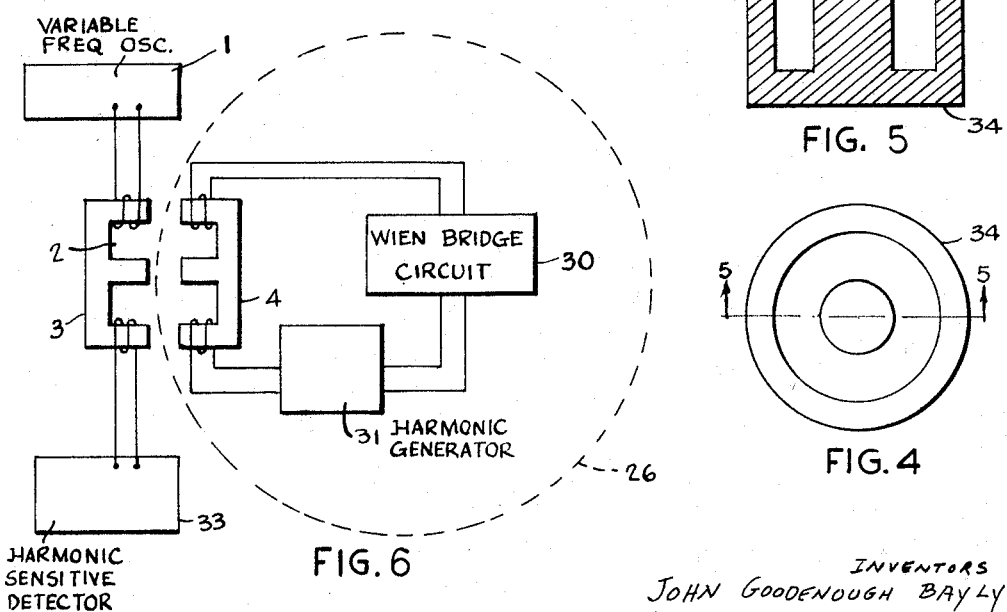

3,310,736
METHOD AND APPARATUS FOR TRANSMITTING SIGNAL INFORMATION FROM AN ENCLOSED REGION TO AN EXTERIOR REGION WITHOUT DIRECT ELECTRICAL CONNECTION BETWEEN THE REGIONS
John Goodenough Bayly and Edward Hesketh de Grey, Deep River, Ontario, Canada, assignors to Atomic Energy of Canada Limited, Ottawa, Ontario, Canada, a corporation
Filed Oct. 4, 1963, Ser. No. 313,824
21 Claims. (Cl. 324—62)

This application is a continuation-in-part of application Ser. No. 102,866, filed Apr. 13, 1961, and now abandoned, and entitled, "Electrical Measurements Through Vessel Walls."

This invention relates to a method and apparatus for transmitting signal information, representing variable parameters, from one region to another region, without direct electrical connection between the two regions.

More particularly, this invention relates to a method and apparatus for measuring variable parameters by electrical means in a sbstance which is so situated as to prohibit direct electrical connection between the substance and an observing station, and finds particular use in a vessel through the walls of which it is not convenient to run electrical conducting leads.

The invention further relates to a method and apparatus for sensing information from a rotating assembly by electrical means, wherein there exists no direct electrical connection between the rotating assembly and the observation station. The invention has particular utility where it is desired to transfer information from a rotating assembly without utilizing any physical contact with the assembly. Lack of extreme accuracy in the concentricity and speed of rotation does not adversely influence the operability of the invention.

Present day electrical measurements of physical parameters (such as temperature) require continuous insulated electrical conductors from the sensing element to the rest of the instrumentation. If the variable is inside some closed vessel, or container, it is usual to employ insulated seals (such as Kovar, etc.). These seals are usually fragile in nature, difficult to install and to make completely leak free, and are often a source of trouble. This problem of fragility is acute for rods for nuclear fuel studies in which the insulated seals are subject to temperature and pressure changes and prone to damage due to the necessity of remote handling.

An apparatus constructed in accordance with the teaching of this present invention these seeks to overcome these difficulties and obviates the need for insulated conductors through the walls of the vessel. The apparatus will be found particularly useful and adaptable to the growing list of transducers whose output is a resistance, capacitance or inductance which varies as a function of the property or parameter being measured. It may also be adapted to permit measurement of properties of a substance which moves continuously with respect to an observer, such as a continuously rotating member, without the use of slip rings.

In accordance with the invention, there is therefore provided an apparatus for measuring a property of a substance by electrical means, said substance being so situated to prohibit direct electrical connection between it and an observing station, which comprises a frequency sensitive alternating current bridge adjacent said substance, the bridge having an input and an output and being of the type whose output is a minimum for one value of input frequency, at least one element in said bridge circuit variable in accordance with the property to alter the frequency at which said output is a minimum, a source for the input, a detector for the output and at least one transformer having a primary and a secondary winding between said bridge and said observing station, said transformer being constructed to transmit magnetic flux between the primary and secondary and to permit relative movement between them.

Further, sliprings and commutators are commonplace where electrical signals have been transferred from a rotating assembly. There has, however, existed the need for transfer of such information not only without the introduction of sliding friction between associated brush gear and the said sliprings and commutators, but there has been the need for such signal-transfer from rotating assemblies that have been rotating at exceptionally high speeds. Under such conditions, and more particularly, in the high vacuum of outer space, brushes have presented particular problems from the point of view of friction, wear, contact electrical noise, and heat generated by rubbing contacts. Further, it has sometimes been necessary to electrically insulate the rotating assembly from the mounting particularly in cases where the rotating assembly is held at a high electrical potential.

Another embodiment to be constructed in accordance with the teaching of this present invention seeks to overcome the difficulties and obviates the need for any direct electrical connection between the rotating assembly and the observation point. The apparatus will be found particularly useful and adaptable to the growing list of transducers whose output exhibits a variable resistance, capacitance or inductance which varies as a function of the parameter being measured within the rotating assembly. The apparatus requires only that the information which is to be sensed from within the rotating assembly be transduced into a variable capacitance or inductance or resistance, with such variations in the said capacitance, inductance or resistance, with such variations in the said capacitance, inductance or resistance being sensed by an alternating current bridge, within the rotating assembly, that may be balanced by variation of the frequency applied thereto.

In accordance with the invention there is, therefore, also provided a method of sensing signal information from a rotating assembly comprising the steps of: generating a first variable frequency oscillatory signal, producing a first alternating magnetic flux at a first fixed zone relative to the axis of rotation of said assembly, intercepting said flux at a first zone on said assembly rotating about said axis with respect to said first fixed zone, generating a second variable frequency oscillatory signal by means of the interception of said first flux, producing a variable frequency oscillatory third signal as a function of said second signal and said signal information, said third signal having an amplitude indicative of the relation between said second signal and said signal information, producing a second alternating magnetic flux at a second selected zone on said assembly, intercepting said second alternating magnetic flux at a second fixed zone in relation to the axis of rotation of said assembly, with the angle subtended by said first and second fixed zones at the axis of rotation being equal to the angle subtended by the said first and second rotating zones at the axis of rotation, and generating a detecting signal by means of said interception of said second alternating flux and adjusting the frequency of said first variable oscillatory signal until the value of said signal information is indicated.

In accordance with the invention, there is further provided another embodiment for sensing signal information from a rotating assembly comprising: a variable frequency oscillator producing a first variable frequency output signal, a first flux producing means having a first fixed zone relative to the axis of rotation of said assembly, said first flux producing means being connected and responsive to said first variable frequency output signal, first flux intercepting means disposed at a first moving zone on said assembly, said first flux intercepting means being adapted to produce a second variable frequency output signal, an alternating current bridge circuit adapted to receive said second variable frequency output signal and said signal information, said bridge circuit having a first variable frequency comparison output signal which is indicative of the relationship between said second variable output signal and said signal information, a second flux producing means disposed at a second moving zone on said assembly, said second flux producing means connected and responsive to said first variable frequency comparison signal, a second flux intercepting means disposed at a second fixed zone relative to the axis of rotation of said assembly, said second flux intercepting means being adapted to produce a third variable frequency output signal, said first and said second fixed zones coinciding with said first and second moving zones at some time during the rotation of the axis and, detector means connected and responsive to said third variable frequency output signal, said detector means being adapted to indicate when the said oscillator output signal has a frequency appropriate for balance of the said alternating current bridge.

In the description of two particular embodiments of the invention which follows, the signal information is transduced into two variable resistances. Reference will be made to the drawings in which:

FIG. 3 shows a partly diagrammatic view of another embodiment of the invention applied to frictionless sliprings.

FIG. 4 shows a top view of a pot type magnetic core used in one embodiment of this invention.

FIG. 5 shows a cut taken along line 5—5 of FIG. 4.

FIG. 6 shows another embodiment of the invention where only one transformer is used to couple information in and out of the apparatus.

Figure 1:
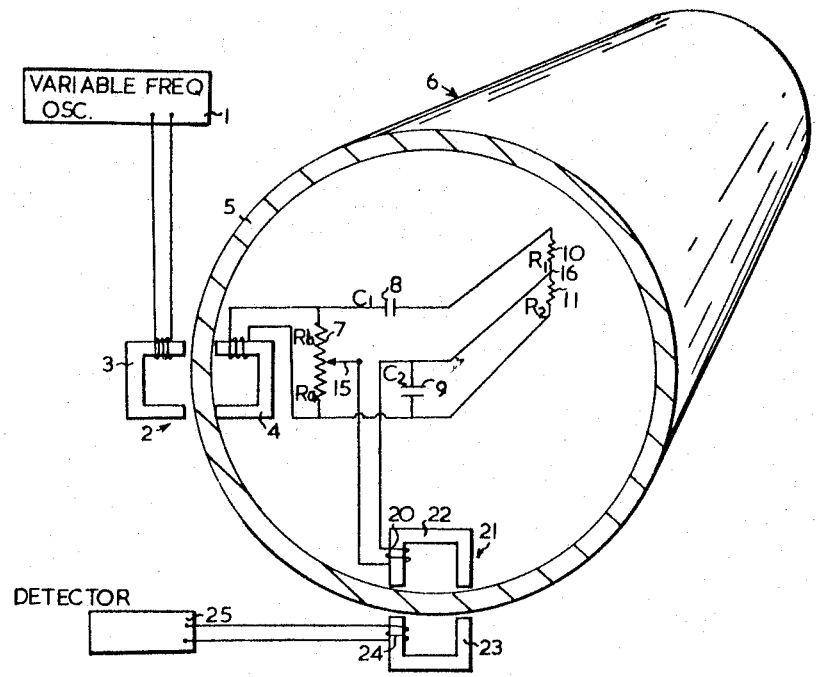
FIG. 1 shows a partly diagrammatic view of a circuit arrangement of an embodiment of the invention applied to a vessel.

FIG. 1 shows an apparatus for measuring the temperature inside a closed vessel and employs a Wien bridge circuit in which the bridge network is included within the walls of the vessel. An oscillator 1 for feeding the circuit drives a transformer 2, and there is a flux linkage between the primary core 3 of transformer 2 and the secondary core 4 through the wall or enclosing means 5 of vessel 6. The Wien bridge circuit consists of a potentiometer 7, condensers 8 and 9 and temperature sensitive elements 10 and 11. In this embodiment, elements 10 and 11 form the probe for detection of the temperature to be measured. Null detection is obtained between the tapping point 15 of the potentiometer 7 and the junction 16 between resistor 10 and 11. Output voltage for null detection is taken to the primary 20 of a transformer 21 which has a split core composed of two parts 22 and 23 linked magnetically through the wall 5 of the vessel 6. Secondary winding 24 of transformer 21 thus has a voltage induced in it which is proportional to the output of the bridge and is observed in a null detector 25.

Now if the resistance of the two parts of the potentiometer 7 are Ra and Rb respectively, if the capacities of condensers 8 and 9 are $C_1$ and $C_2$ and if the resistance 10 and 11 are $R_1$ and $R_2$ respectively then the equations for balance are:

$$f=\frac{1}{2\pi}\left(\frac{1}{R_1R_2C_1C_2}\right)^{1/2} \qquad (1)$$

$$\frac{C_2}{C_1}=\frac{Rb}{Ra}-\frac{R_1}{R_2} \qquad (2)$$

It is convenient to choose a special case and to make $$C_2=C_1;\ R_2=R_1$$

The equations for balance then become:

$$f=\frac{1}{2R_1C_1}=\frac{1}{2R_2C_2} \qquad (3)$$

$$Rb=2Ra \qquad (4)$$

It can be seen from Equation 3 that the frequency of balance is directly related to the time constants $R_1C_1$ and $R_2C_2$ and a given percentage change in the resistance of the resistive transducers results in the same percentage change of frequency for balance. The resistors Ra and Rb and condensers 8 and 9 must remain constant while the signal information varies. Since the resistive transducers are chosen as a sensitive element, the condensers must be sufficiently stable that their changes with the signal information will be small relative to the smallest significant percentage resistive change and vice versa. In practice, the resistive transducers may have a certain inductive effect but variations in the ratio of the respective resistances Ra and Rb can be used to minimize it.

As shown by Equations 1 and 2, the bridge can be balanced by varying the frequency and by movement of the slider 15 of the potentiometer 7. The bridge circuit need not be touched again and can be sealed leaving only the chosen transducing elements to vary in accordance with the signal information to be sensed, subsequent balancing being achieved by frequency variation (Eq. 1), provided $R_1/R_2$ remains fixed satisfying Eq. 2.

In other embodiments of the invention, the transducing elements may be the capacitors 8 and 9 instead of resistors 10 and 11, or if a resonance bridge is used, the transducing element may be either a capacitor or an inductor.

In the Wien bridge, if the ratios $R_1/R_2$ or $C_1/C_2$ change, the bridge output may not reach zero, but the balance frequency can be defined as the frequency at which the error signal has a predetermined phase relative to the oscillator signal. This is readily determined by the use of a phase sensitive detector, familiar to those skilled in the art.

The wall of the vessel 6 through which coupling is made by the two transformers 2 and 21 may normally be any non-magnetic material and the thickness of the wall is not important as long as it is not large relatively to the skin depth for alternating magnetic fields at the frequency of source 1, nor much greater than the width "b" of the laminations (specified later). In two particular constructed embodiments the non-magnetic materials, Zircaloy II of .165″ thickness and Austenitic Stainless Steel, of .125″ thickness have both been used successfully. (At three thousand cycles per second, the skin depth is about .3″ in stainless steel.) Insulating materials may be employed when the separation of the cores is determined by the limitation of the core width "b" (specified later). It is found, in fact, that ferromagnetic materials may be used too, although the skin depth for a given frequency will be smaller and a decrease of frequency of source 1 and/or of thickness of wall material is desirable compared with those embodiments using non-magnetics or insulators.

Figure 2:
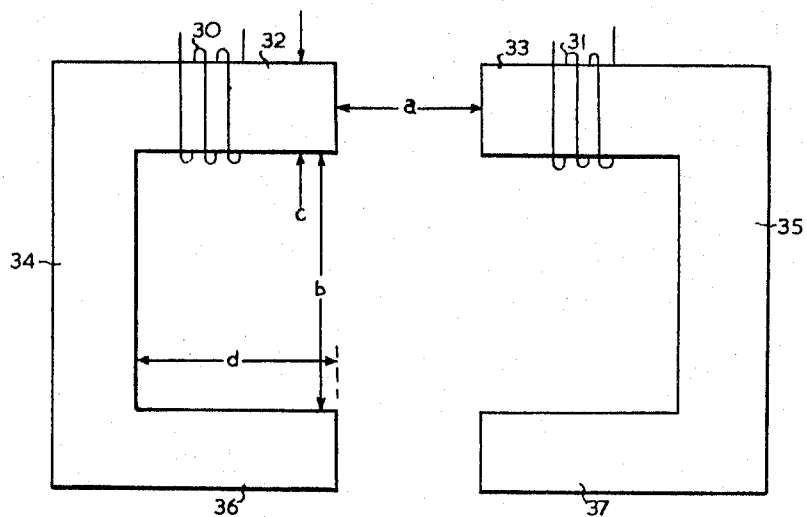
FIG. 2 shows a plan view of details of a transformer for use with the invention.

The transformers 2 and 21 have normal windings associated with audio-frequency practice, but their cores are modified to reduce the large leakage flux which occurs because of the separation across the vessel walls. In a particular construction, the transformers had cores built up from C-shaped laminations and took the form shown in FIGURE 2, where the laminations of each core are similar. The primary 30 and secondary windings 31 were each wound on separate mutually facing legs 32 and 33 of the core sections 34 and 35. In FIGURE 2, "$a$" represents the gap between the cores due to the vessel walls. "$b$" is the distance between the opposite legs 32 and 36 or 33 and 37, of each core half. "$d$" represents the depth of the core, and "$b$" was not made less than "$a$"; in view of the leakage flux at greater separations of the two halves. In this embodiment "$b$" might be greater than or equal to twice "$a$." The core section may be square or rectangular with the area being determined by core saturation conditions. "$c$" is a core dimension.

In another particular construction, pot type magnetic cores 34, as shown in FIGURES 4 and 5, of the same design criteria were employed.

FIG. 3 shows an apparatus for sensing information from a rotating assembly and which employs a Wien bridge circuit in which the bridge network is included on the rotating assembly. In FIG. 3 items corresponding to identical ones in the first embodiment have the same numerals. An oscillator 1 has a first variable frequency output signal for feeding one half 3 of a split transformer 2, said half 3 being located at a first fixed zone, relative to the axis of rotation of the rotating assembly, said rotating assembly being all that lies within the dotted circle 26. The rotating assembly represented by circle 26 has an axis of rotation indicated at 27. A second half core 4 of the transformer 2 rotates with the assembly, being located at a first moving zone on said assembly. There is flux linkage between the primary core 3 of the transformer 2 and the secondary half core whenever the primary and secondary cores 3 and 4 aligned radially. When the cores 3 and 4 are radially aligned, there will be produced, in the winding on core 4, a second variable frequency output signal for feeding the Wien bridge as will be described hereinafter. As the previous embodiment the Wien bridge circuit consists of a potentiometer 7, condensers 8 and 9, and resistive transducers 10 and 11 whose resistive value is a function of the signal information which it is desired to sense at an external and static observation position. Null detection is obtained between the tapping point 15 of the potentiometer 7 and the junction 16 between the resistive transducers 10 and 11, thereby to produce a third variable frequency output signal. Such output signal for null detection is taken to the primary 20 of a transformer 21 which has a split core composed of two parts 22 and 23. Core 22 is located at a second moving zone on said assembly, and core 23 is disposed at a second fixed zone. Magnetic linkage occurs through a portion of the rotating assembly 26 when the cores 22 and 23 are aligned radially. Secondary winding 24 of the transformer 21 thus has a voltage induced in it, constituting a fourth variable frequency output signal, which is a function of the output of the bridge and is observed in a null detector 25. In order that the oscillator signal be effective to produce the various signals, the distance measured along the circumference between the first and second fixed zones and the distance between the first and second moving zones must subtend from the same angle at the axis 27.

*Table I*

Transformer of "C" cores are of ¼" x ¼" section of mumetal for core 34 and 1" x ¼" section of mumetal for core 35.

Window ⅞" deep ($b$) x 1⅛" wide ($d$)
Windings approximately 3000 turns of #26 s.w.g.
Frequency ($f$) 1020 c.p.s.

Close spaced cores:

$L_1$, 1.83 h.; $L_2$, 1.42 h.; $L_1+L_2+2M=5.5$ h.; $Q=41$
$Q_1$ 30; $Q_2$ 30; $L_1+L_2-2M=.99$; $Q=11.5$
$R_1$, 390 ohms; $R_2$, 300 ohms $$K = \frac{M}{L_1+L_2}$$

so $M=1.33$ h.
$K=0.83$

Spaced ⁷⁄₃₂", air gap:

$L_1$, 1.02 h.; $L_2$, 62 h.; $L_1+L_2+2M=2.14$ h.; $Q=24$
$Q_1$, 20; $Q_2$, 17; $L_1+L_2-2M=1.14$ h.; $Q=13$
$R_1$, 326 ohms; $R_2$, 230 ohms
$M=.25$ h.
$K=0.31$ Spaced ⁷⁄₃₂", ⅛" Stainless Steel:

$L_1$, 0.99 h.; $L_2$, 0.60 h.; $L_1+L_2+2M=2.07$ h.; $Q=4$
$Q_1$, 5 h.; $Q_2$, 5.5 h.; $L_1+L_2-2M=1.13$ h.; $Q=1.8$
$R_1$, 1270 ohms; $R_2$, 700 ohms
$M=0.26$ h.
$K=0.34$

*Table II*

Transformer of "C" cores each ¼" x ¼" section of mumetal,
Windings approximately 3000 turns of #26 s.w.g.
Frequency 1020 c.p.s.

Close spaced:

$L_1$, 1.25 h.; $L_2$, 1.9 h.; $L_1+L_2+2M=5.7$ h.; $Q=40$
$Q_1$, 29; $Q_2$, 30; $L_1+L_2-2M=0.64$ h.; $Q=10$
$R_1$, 276 ohms; $R_2$, 405
$M=1.27$ h.
$K=0.82$ Spaced ⁷⁄₃₂", air gap:

$L_1$, 0.40 h.; $L_2$, 0.59 h.; $L_1+L_2+2M=1.22$ h.; $Q=19$
$Q_1$, 14; $Q_2$ 16; $L_1+L_2-2M=0.74$ h.; $Q=12$
$R_1$, 183 ohms; $R_2$ 232 ohms
$M=0.12$ h
$K=0.27$ Spaced ⁷⁄₃₂", ⅛" Stainless Steel:

$L_1$, 0.38 h.; $L_2$, 0.58; $L_1+L_2+2M=1.21$ h.; $Q=5.4$
$Q_1$, 7; $Q_2$, 6.5; $L_1+L_2-2M=0.74$ h.; $Q=11.5$
$R_1$, 348 ohms; $R_2$, 384 ohms
$M=0.12$ h.
$K=0.31$ It is seen from the tables that, as the gap is increased, the self inductance of each winding and the mutual inductance are both reduced. However, there is still appreciable coupling and energy transfer. Introduction of the conducting vessel wall leaves the mutual inductance (M) and coupling coefficient (K) practically unchanged, whereas the Q of the windings is reduced, indicating increased losses. Energy transfer still occurs, however, and the load and number of turns on the windings could be adjusted to make this optimum.

In an experimental system, the resistive transducers 10 and 11 may have a nominal resistance of 120 ohms and the condensers 8 and 9 can be .47 microfarad capacitors. This capacity was large relative to the stray capacitance in the circuit so that variations in these stray effects were negligible. The temperature coefficient of the condensers should be small but it is not critical. The potentiometer 7 was of 50,000 ohms and the slider 15 was adjusted to the point of best null as shown in the null detector 25 when the bridge was balanced. The detector was an oscilloscope. A calibration of the apparatus may be performed under static conditions wherein a graph may be plotted of signal information against oscillator frequency necessary for balance.

It will be appreciated in the use of this equipment, that it is the frequency of balance of the bridge which is the criterion and not the power or voltage, providing null detection is used to establish that the frequency of the oscillator has been set to the correct value to balance the bridge. It is, of course, necessary that some means be provided to synchronize the rotating assembly (which is rotated by rotating means 35) with the detector display, and, as stated hereinbefore, this can readily be done on an oscilloscope, by providing it with a synchronizing signal from axis 27 to a built in synchronizing means which many oscilloscopes possess. In FIG. 3, 29 represents diagrammatically synchronizing means between the rotating assembly and the detector. Since the transfer of information across the cores of transformer 2 and transformer 21 must occur at the same time, it is necessary that the angle at the axis 26 between core 3 and core 23 of the two fixed cores, be the same as the angle at the axis 26 between the two moving cores 4 and 22 of transformer 21.

Although separate transformers have been shown for input and output to and from the bridge, it is possible to use only one providing the input and output can be decoupled from one another as shown in FIG. 6. Thus, if the output of the Wien bridge circuit 30 were used to generate harmonics by a harmonic generator 31, such as by feeding the output through a rectifier, this harmonic output could be fed back through the input transformer and picked off outside the rotating assembly from the primary core. Using E-shaped laminations, one transformer could be made to operate in two modes by placing an additional winding on the primary and secondary core, in this way, the output could be fed to a harmonic sensitive detector 33 through the same transformer as the input from the source.

It is because the frequency of balance does not depend on the amplitude of the input or the output signals on the bridge circuit, that the system is relatively independent of the coupling across the transformers and thus, the periodic transfer between the respective halves of the transformers is sufficient to transfer the information from the rotating assembly to the static observation point. For the same reason, exact coupling does not affect the balance so that close mechanical tolerances are unnecessary.

In the application to nuclear fuel element testing, the rod may be assembled with the Wien bridge, and the internal parts of each transformer in place, the second halves of the transformers are then placed adjacent the corresponding internal parts and are connected to source, and detector, adjustments are then made to balance the bridge by source adjustment and to the potentiometer slider 15. The rod is then sealed. After the rod is in the reactor the second halves of each transformer may be clamped at the appropriate positions. Since the exact coupling does not affect the balance, close mechanical tolerances are unnecessary. The rest of the instrumentation may be remote from the face of the reactor.

In some applications, either the source or detector might be placed in the closed vessel if it were only necessary to take action at a certain chosen value of the property or if detection and action were required at only specific moments that the source was switched on by an observer.

The embodiments of the invention in which an exclusive property or privilege is claimed are defined as follows:

1. A method of transmitting signal information from an electrical transducer, located within an assembly having complete enclosing means, to an exterior observation station, without direct electrical connection between said transducer and said observation station, which method comprises the steps of:
   (i) generating a first variable frequency oscillatory signal, exteriorly of said assembly,
   (ii) utilizing said first variable frequency oscillatory signal to produce a first magnetic flux exteriorly of said assembly and adjacent thereof,
   (iii) intercepting said first magnetic flux at a first zone interiorly of said assembly,
   (iv) generating a second variable frequency oscillatory signal within said assembly by means of the interception of said first flux,
   (v) producing a variable frequency oscillatory third signal within said assembly as a function of said second variable frequency oscillatory signal and said signal information, said third signal having an amplitude indicative of the relationship of said second signal and said signal information,
   (vi) producing a second alternating magnetic flux, by means of said first comparison signal, interiorly of said assembly at a second zone thereon,
   (vii) intercepting said second alternating magnetic flux, exteriorly of said assembly, at said second zone,
   (viii) generating a detecting signal by means of said interception of said second alternating magnetic flux, and adjusting the frequency of said first variable frequency oscillatory signal to establish a balance frequency,
   (ix) utilizing said balance frequency to indicate the value of said signal information.

2. The method of claim 1 wherein said assembly and said enclosing means is rotating, and wherein said first magnetic flux is intercepted to generate said second variable frequency oscillatory signal instantaneously, at the rate of at least one interception per revolution of said assembly, with the interception of said second alternating magnetic flux.

3. Apparatus for transmitting signal information from an electrical transducer, located within an assembly having complete enclosing means, to an exterior observation station, wherein direct electrical connection between said transducer and said observation station is prohibited, which apparatus comprises,
   (i) a variable frequency oscillator, located exteriorly of said assembly, said oscillator generating a first variable frequency oscillating signal,
   (ii) a first transformer including a split core forming first and second spaced apart sections of said core, a winding on each of said first and second sections respectively, said first section being located exteriorly of said assembly and said second section being located interiorly of said assembly, said winding on said first section being connected and responsive to said first variable frequency oscillating signal,
   (iii) a frequency sensitive alternating current bridge located interiorly of said assembly, the bridge having an input and an output, said output being a minimum for one value of input frequency, said transducer forming part of said bridge circuit, said input being connected to said winding on said second section,
   (iv) a second transformer including a split core forming third and fourth spaced apart sections of said core, a winding on each of said third and fourth sections, respectively, said third section being located interiorly of said assembly and said fourth section being located exteriorly of said assembly, said winding on said third section being connected and responsive to said output from the bridge, and,
   (v) detector means located at said exterior observation station said detector means being connected and responsive to said winding on said fourth section, said detector indicating, upon adjustment of said variable frequency oscillator, that said bridge is balanced for an appropriate value of said signal information from said transducer, and wherein the frequency of said oscillator is indicative of the value of said signal.

4. Apparatus of claim 3 wherein said second and third sections, said bridge, said transducer, and all electrical connections associated therewith, form said assembly, said assembly having a circumference and means for rotating about an axis of rotation, said second and third sections being angularly disposed relative to the axis of rotation by a selected angle and located on said circumference, said first and fourth sections being non-rotatable relative to said axis of rotation and angularly disposed, relative to said axis by the same selected angle and located on a second common circumference, whereby said first and second and said third and fourth sections are juxtaposed at the same instant.

5. Method of sensing signal information from within a rotating assembly having enclosing means, comprising the steps of:
  (i) generating a first variable frequency oscillatory signal,
  (ii) utilizing said first variable frequency oscillatory signal thereby to produce a first alternating magnetic flux at a first fixed zone relative to the axis of rotation of said assembly,
  (iii) intercepting said first flux at a first zone on said assembly rotating with respect to said first fixed zone about said axis,
  (iv) generating a second variable frequency oscillatory signal by means of the interception of said first flux,
  (v) producing a variable frequency oscillatory third signal as a function of said second signal and said signal information, said third signal having an amplitude indicative of the relationship of said second signal and said signal information,
  (vi) producing a second alternating magnetic flux at a second selected zone on the said assembly, by means of said third signal, said second selected zone rotating about said axis with respect to a second fixed zone,
  (vii) intercepting said second alternating magnetic flux at said second fixed zone in relation to the axis of rotation of said assembly, said first and second fixed zones and said first and second rotating zones subtending the same angles,
  (viii) generating a detecting signal by means of said interception of said second alternating flux, and adjusting the frequency of said first variable oscillatory signal until the value of said signal information is indicated.

6. Apparatus for sensing signal information from within a rotating assembly having enclosing means, comprising:
  (i) an oscillator having a first variable frequency output signal,
  (ii) first flux producing means disposed at a first fixed zone relative to the axis of rotation of said assembly, said first flux producing means being connected and responsive to said first variable frequency output signal,
  (iii) first flux intercepting means disposed at a first moving zone on said assembly, said first flux intercepting means having a second variable frequency output signal,
  (iv) an alternating current bridge circuit responsive to said second variable frequency output signal and said signal information, said bridge circuit having a first variable frequency comparison output signal which is indicative of the relationship between said second variable output signal and said signal information,
  (v) second flux producing means disposed at a second moving zone on said assembly, said second flux producing means connected and responsive to said first variable frequency comparison signal,
  (vi) second flux intercepting means disposed at a second fixed zone relative to the axis of rotation of said assembly, said second flux intercepting means having a third variable frequency output signal, said first and second fixed zones and said first and second moving zone subtending the same angles, and,
  (vii) detector means connected and responsive to said third variable frequency output signal, said detector means indicating when the said oscillator output signal has a frequency appropriate for balance of the said alternating current bridge.

7. Apparatus in accordance with claim 6 wherein said first and second flux producing means includes half cores of respective transformers.

8. The apparatus according to claim 6 wherein said first and second flux intercepting means includes halves of respective transformers.

9. The apparatus of claim 6 wherein said alternating current bridge is a Wien bridge.

10. The apparatus of claim 6 wherein said detector means is an oscilloscope.

11. An apparatus for measuring a property of a substance by electrical means, said substance being so situated and subject to movement whereby direct electrical connection between it and an observing station is prohibited, which comprises, a frequency sensitive alternating current bridge adjacent said substance, the bridge having an input and an output and being of the type whose output is a minimum for one value of input frequency, at least one element forming part of said bridge circuit being variable in accordance with said property of said substance, variations in said element altering the frequency at which said output is a minimum, a source of alternating current, an alternating current detector, means including at least one transformer, for coupling said source to said input and said output to said detector, said transformer including a split core forming first and second spaced apart sections of said core, a winding on each of said first and second sections respectively, said first section being mounted adjacent said observing station, and said second section being mounted adjacent said substance, means for moving said substance, said bridge, and said second section as a unit with respect to said first section said first and second sections being aligned for a least a part of the time of said moving for magnetic coupling therebetween, whereby said bridge is energized by said source and said detector is connected to said output for detecting variations in said property.

12. The apparatus as defined in claim 11 wherein said source and said detector are situated at the observing station.

13. The apparatus of claim 11 wherein said transformer is for connecting said source to said input and said coupling means includes a second transformer for coupling said output to said detector.

14. An apparatus as defined in claim 12 comprising a first transformer for coupling said source to said input and a second transformer for coupling said output to the detector, said transformers each having a primary and a secondary winding, a primary core section for each primary winding and a secondary core section for each secondary winding, said section of said first transformer and said primary section of said second transformer being mounted adjacent said substance.

15. An apparatus as defined in claim 14 wherein said frequency sensitive bridge is a Wien bridge.

16. An apparatus as defined in claim 14 wherein said core sections comprise C-shaped laminations.

17. The apparatus as defined in claim 11 including a wall comprising a closed vessel for enclosing said substance, bridge, and said second section of said transformer, said second section being mounted adjacent said wall, said first and second sections being thereby mutually magnetically coupled through said wall.

18. An apparatus as defined in claim 11 wherein said core sections are of pot type construction.

19. Apparatus as in claim 17 including means in said coupling means for causing generation of at least one harmonic of said output, said detector being sensitive to said harmonic.

20. Apparatus as in claim 11 including harmonic generator means coupling said output to said transformer, said source and input being also coupled together by the said transformer.

21. Apparatus as in claim 11 including means for delivering at least one harmonic of said output to said detector for sensing thereby.

References Cited by the Examiner
UNITED STATES PATENTS

| | | | |
|---|---|---|---|
| 2,008,857 | 7/1935 | Flanders | 324—62 |
| 2,155,267 | 4/1939 | Hathaway | 324—62 |
| 2,563,254 | 8/1951 | Lewis | 324—62 |

WALTER L. CARLSON, *Primary Examiner.*

FREDERICK M. STRADER, *Examiner.*

W. H. BUCKLER, E. E. KUBASIEWICZ,
*Assistant Examiners.*